Sept. 12, 1967 A. R. GERHARD 3,341,445

ANODIZATION CONTROL CIRCUITS

Filed Sept. 1, 1964 3 Sheets-Sheet 1

INVENTOR
A. R. GERHARD
BY [signature]
ATTORNEY

Sept. 12, 1967 A. R. GERHARD 3,341,445

ANODIZATION CONTROL CIRCUITS

Filed Sept. 1, 1964 3 Sheets-Sheet 2

3,341,445

ANODIZATION CONTROL CIRCUITS

Allen R. Gerhard, Fullerton, Pa., assignor to Western Electric Company, Incorporated, New York, N.Y., a corporation of New York Filed Sept. 1, 1964, Ser. No. 394,104
12 Claims. (Cl. 204—228)

This invention relates to anodization control circuits, and more particularly to circuits for anodizing a metal object to increase the resistance thereof to a desired value. Accordingly, the general objects of this invention are to provide new and improved circuits of such character.

In the manufacture of thin-film resistors, a thin-film of metal, such as tantalum, is deposited on a dielectric substrate. Thereafter, a desired resistor configuration is generated by selectively masking a portion of the metal film with an etch resistant material, and then etching the film to remove the unmasked portions thereof. The dimensions of the resistor thus formed determine its resistance value.

Because of difficulties encountered in accurately controlling the film deposition to the degree required to produce highly accurate resistors, it has been found desirable to deposit the film such that the resultant resistor after etching will have a value approximating, but less than, the desired value. The resistor is then brought up to value by subjecting it to an anodization process. Anodization oxidizes the film, thereby reducing its effective thickness and, hence, its cross sectional area. This, of course, results in an increase in the film resistance.

One of the problems encountered in the anodization process is termination of the process when the resistor has reached its desired value. Thus, if the process is prematurely terminated, the resistor will be below the desired value, and, conversely, if the resistor is over anodized, its resistance will be greater than the desired value. Accurate termination, however, generally requires some type of resistance monitoring. This, on the other hand, is complicated by the flow of anodizing current through the resistor which, of course, must be taken into account in any attempt to test the resistance of the resistor during anodization.

It is, therefore, another object of this invention to provide new and improved circuits for anodizing a thin-film resistor to increase its resistance to a desired value, which circuits are particularly efficacious in solving the aforementioned problem, are automatic, and are highly accurate and efficient.

One circuit which has proven to be satisfactory in this regard is that disclosed in the co-pending application of Edward A. La Chapelle, Ser. No. 393,705, filed Sept. 1, 1964, and assigned to the assignee of the present application. Briefly, as disclosed in that application, the object to be anodized is incorporated in an electrolytic anodizing cell as the anode thereof, and the circuit includes current supplying means and resistance testing means. Means are provided for alternately switching the current supplying means across the cell and the resistance testing means into testing relationship with the object, to alternately anodize the object and test the resistance thereof. Means, responsive to the resistance testing means, are provided for terminating the anodization when the object has reached a desired resistance value. One of the problems which may arise in a circuit of this type is that of switching transients causing erroneous operation of the circuit.

It is, therefore, still another object of this invention to provide new and improved anodization control circuits of the alternate anodizing and testing type which eliminate the problem of switching transients and thereby further improve the accuracy of the anodization.

In accordance with the foregoing and other objects, a circuit, embodying certain principles of the invention for anodizing a metal object in an electrolytic anodizing cell, may include an A.C. source connected to the cell such that during one half of a cycle the source supplies anodizing current to the cell to anodize the object and thereby progressively increase its resistance and, during the other half of a cycle, the source supplies testing current to the object to test the resistance thereof. A detector responsive to the voltage drop across the object resulting from passage therethrough of the test current, and connected to the object such that it is operable only during the half cycle when test current is flowing, is provided for detecting when the object has reached a desired resistance value.

Other objects, advantages and features of the invention will be apparent from the following detailed description of specific embodiments, thereof, when read in conjunction with the appended drawings, in which.

Figure 1:
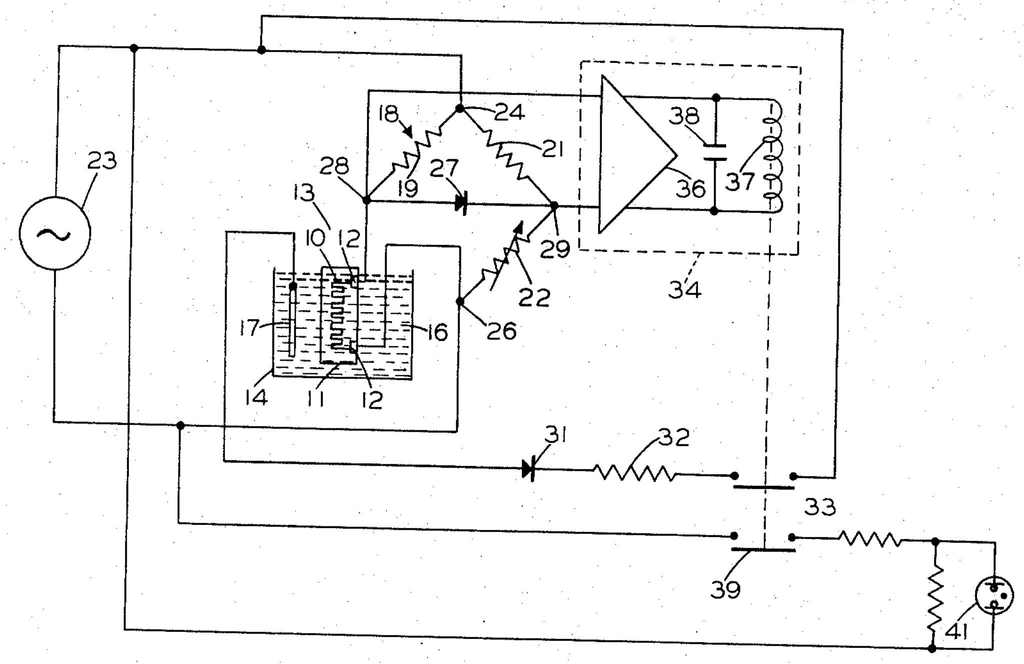
FIG. 1 illustrates schematically an anodizing circuit in accordance with the invention.

Referring now to the drawings, and particularly to FIG. 1, there is shown a first embodiment of a circuit for anodizing a metal object, such as a thin-film resistor 10 which is mounted on a dielectric substrate 11 and is provided with low ohmic contacts 12—12 at its end points. The resistor 10 is incorporated as the anode of an electrolytic anodizing cell 13, which includes a tank 14, a suitable electrolyte 16 and a cathode 17. Typically, the resistor 10 may be composed of tantalum; the substrate 11 may be glass; the low ohmic contacts 12—12 may comprise successive layers of a nickel-chromium alloy, copper and gold; the electrolyte 16 may be deionized water with .01% acetic acid; and the cathode 17 may be tantalum.

In order to effectively anodize the resistor 10, it is necessary to mask the low ohmic contacts 12—12 from the electrolyte 16. Otherwise, the contacts 12—12 would provide a by-pass path of the anodizing current and thereby preclude anodization of the resistor 10. One especially suitable means for accomplishing the masking is disclosed in the co-pending application of Richard D. Sutch, Ser. No. 346,243, filed Feb. 20, 1964, and assigned to the assignee of the present application.

Referring back in FIG. 1, the circuit is seen to include a Wheatstone bridge 18, the four arms of which include respectively, a fixed resistor 19, a fixed resistor 21, a variable resistor 22, and the thin-film resistor 10. An A.C. source 23 is connected across a first pair of opposed junction points 24 and 26 of the bridge 18, and a unidirectional conducting device, such as a diode 27, is connected across a second pair of opposed junction points 28–29 of the bridge. The cathode 17 of the cell 13 is connected to one side of the supply 23 through a unidirectional conducting device, such as a diode 31, a resistor 32, and a normally open contact 33. As will be explained in more detail hereinbelow, by virtue of this arrangement, during one half of a cycle, the A.C. source 23 supplies anodizing current to the cell 13 and during the other half of cycle, the source supplies testing current to the bridge 18.

The output of the bridge 18 is derived from the junction points 28 and 29 and fed to a suitable detector 34. In this instance, the detector 34 includes an amplifier 36 for amplifying the very weak signal which appears at the bridge output 28–29 when the bridge 18 is very close to a balanced condition, and a suitable voltage responsive device, such as a relay 37, which is coupled to the output of the amplifier and which when energized closes the contact 33 to permit anodization and when de-energized opens the contact 33 to preclude anodization, as will be more fully explained hereinbelow. A capacitor 38 is connected in parallel with the coil of the relay 37. In addition to controlling the contact 33, the relay 37 controls a normally open contact 39 in an indicating circuit which includes an indicating lamp 41 and the A.C. source 23.

Figure 2A:
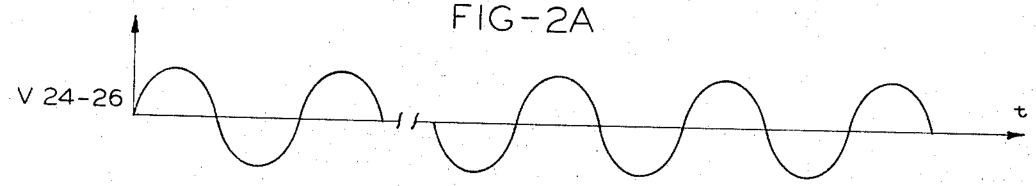
FIGS. 2A–2C illustrate graphically voltage wave forms which may occur in the circuit of FIG. 1, the wave forms being distorted in magnitude for the sake of clarity.
Figure 2B:
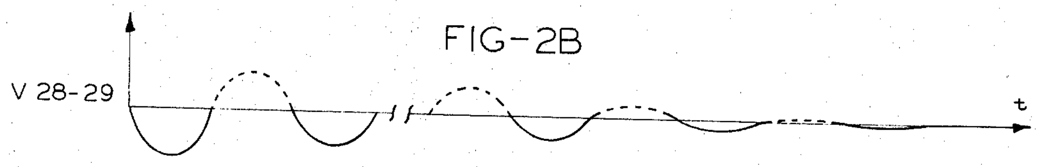
Figure 2C:
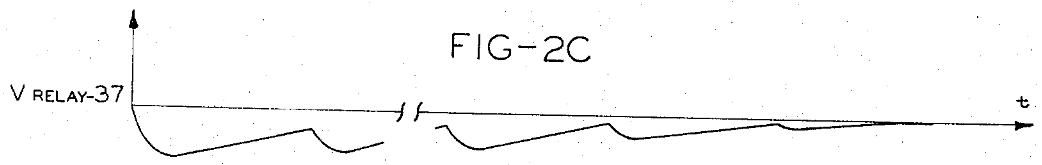

Operation of the circuit may best be understood by referring to the wave forms of FIGS. 2A–2C in conjunction with the following discussion. Proceeding now to the operation of the circuit, it is readily seen that during the half cycle when junction point 24 is at a higher potential than junction point 26 (FIG. 2A), the diode 31 is reverse biased and thereby precludes anodization current from flowing through the cell 13. Accordingly, only test current is supplied to the bridge 18 from the source 23. The values of the bridge resistors 19, 21 and 22 are selected such that during this half cycle, when the resistor 10 is less than its desired value, junction point 28 will be lower in potential than junction point 29, and when the resistor 10 reaches its desired value, junction points 28 and 29 will be at the same potential.

Since the resistance of the resistor 10 at the start of anodization is less than the desired value, junction point 28 during the first half cycle is at a lower potential than junction point 29. Accordingly, the diode 27 is reverse biased and permits the negative half wave output signal of the bridge 18 (FIG. 2B) to be applied to the input of the amplifier 36. After amplification, this signal is applied to the relay 37 and causes the relay to energize and close the contacts 33 and 39. Closure of the contact 33 completes a path from the cathode 17 to the source 23, thereby conditioning the circuit for anodization, and closure of the contact 39 completes the indicating circuit to light the lamp 41.

During the next half cycle, junction point 24 is lower in potential than junction point 26. This, as should be readily apparent, forward biases the diode 31 and thereby permits anodization current to flow through the cell 13. As a result, the surface of the resistor 10 is oxidized; more specifically, the surface of the resistor is converted to tantalum pentoxide. Accordingly, the effective thickness of the tantalum film is reduced with a concomitant increase in resistance.

The resistance of the resistor 32 is selected such that during an anodization half cycle, the potential of the junction point 28 always tends to be greater than that of the junction point 29, as seen in dotted lines in FIG. 2B. Accordingly, during an anodization half cycle the diode 27 will always be forward biased. This, as is readily seen, results in the bridge output 28–29 being shorted and thereby precludes a signal from being applied to the amplifier 36 and, hence, to the relay 37 during this half cycle. The relay 37, however, as seen in FIG. 2C, continues to remain energized by virtue of the voltage stored in the capacitor 38 during the preceding half cycle.

The foregoing cycle of operation continues, until during an anodization half cycle the resistor 10 attains a resistance value equal to the preset balance value of the bridge 18, whereupon during the next testing half cycle, the voltage across the relay 37 drops below that necessary to maintain energization thereof. De-energization of the relay 37 opens the contacts 33 and 39, thereby precluding any further anodization and extinguishing the lamp 41 to advise an operator that the anodization process is completed.

Figure 3:
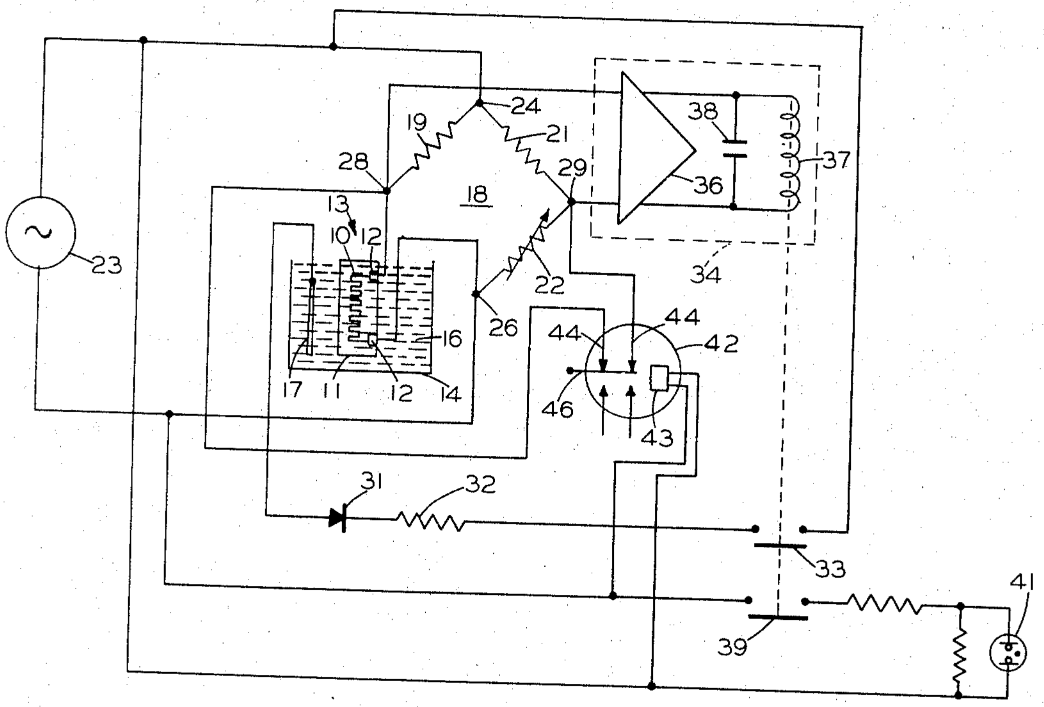
FIG. 3 is a modification of the circuit of FIG. 1.

Referring now to FIG. 3, there is shown a modification of the circuit of FIG. 1. This circuit is essentially identical to the circuit of FIG. 1 with the exception that instead of employing a diode 27 to short the output 28–29 of the bridge 18 this circuit employs a mercury wetted relay 42, the coil 43 of which is connected to the A.C. source 23, and one set of contacts 44—44 of which are connected across the output of the bridge. When the relay 43 is de-energized, the contacts 44—44 are engaged by the armature 46 and short the bridge output 28–29. Conversely, when the relay 42 is energized, the armature 46 disengages the contacts 44—44 and removes the short from the bridge output 28–29.

The advantage in employing a mercury wetted relay 42, or a like device, is that its contacts 44—44 when engaged by the armature 46 present practically an ideal short across the bridge output 28–29, thereby assuring that no input is supplied to the amplifier 36 during anodizing. A diode on the other hand has a finite voltage drop, as well as a finite "threshold" voltage, and accordingly, does not provide an ideal short across the bridge output 28–29 when the bridge 18 is very close to a balanced condition. It should, of course, be obvious that in this circuit the junction point 28 can either be lower or higher in potential than the junction point 29 during the anodization half cycle, since the contacts 44—44 will short these points in either event.

Operation of this circuit is substantially the same as that of the circuit of FIG. 1, the coil 43 of the relay 42 being connected to the A.C. source 23 such that the relay is energized during the half cycle when test current is being supplied to the bridge 18 and is de-energized during the half cycle when anodizing current is being supplied to the cell 13.

In the discussions of the circuits of FIGS. 1 and 3 it was assumed that the resistor 10 at the start of anodization was lower than its desired value. This, however, may not always be the case, since some resistors 10 may unintentionally be fabricated such that their resistance values are greater than the desired value. Although these resistors will not be anodized when connected to the anodizing circuits, it is advisable to provide some means of apprising an operator of the fact that these resistors are above the preset value of the anodizing circuit. It is also advisable that these means not only apprise the operator when a resistor 10 is greater than the preset value, but also whether it is greater by an unacceptable amount. To this end the circuit of FIG. 3 is modified, as illustrated in FIG. 4, to act as a combined anodizer and test set.

Figure 4:
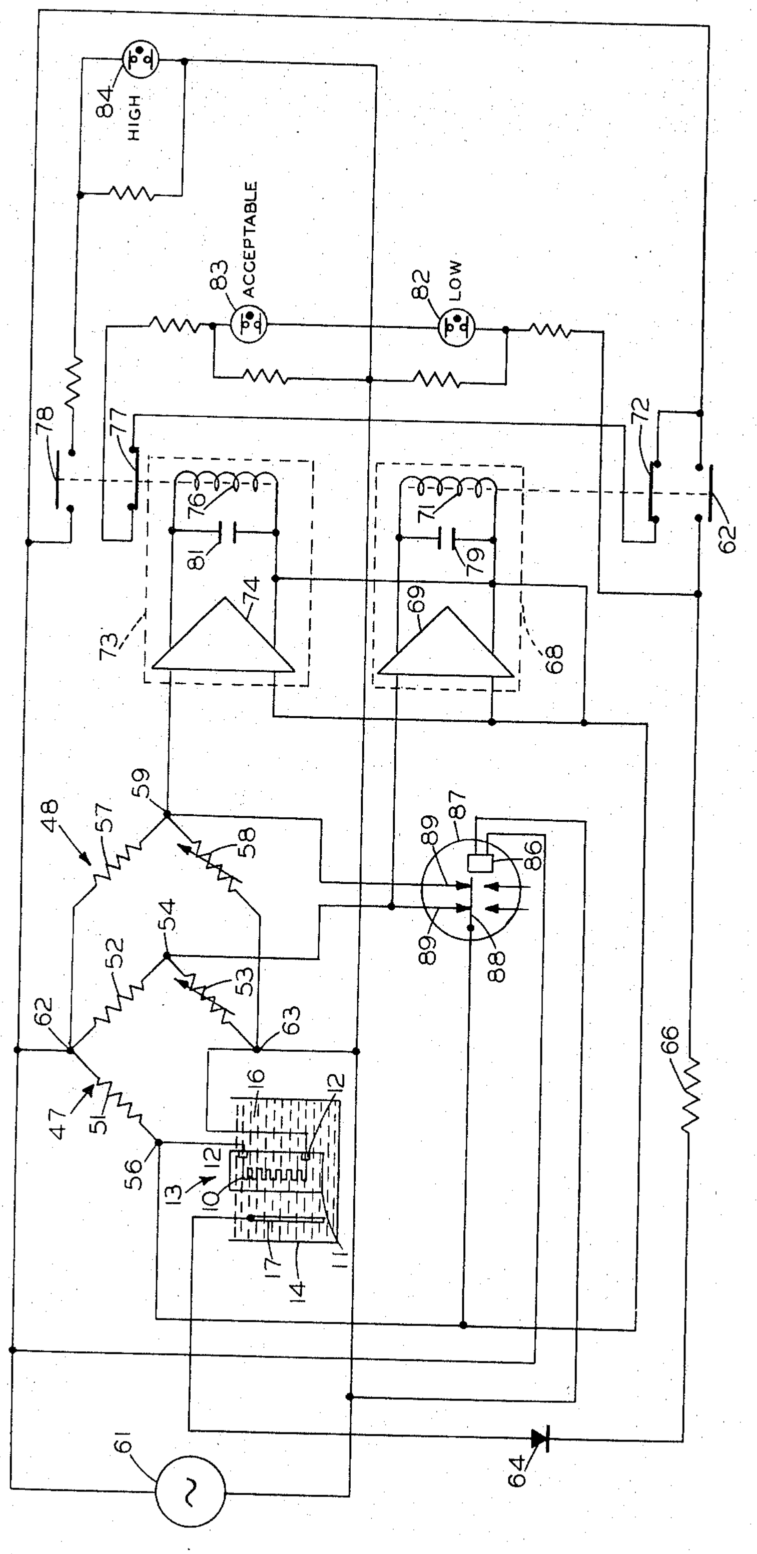
FIG. 4 is a modification of the circuit of FIG. 3 employed as a combined anodizer and test set.

Turning now to FIG. 4, it is seen that this circuit includes two Wheatstone bridges 47 and 48. The bridge 47 is formed by a fixed resistor 51, the thin-film resistor 10, a fixed resistor 52 and a variable resistor 53. The resistors of the bridge 47 are selected such that when the resistance of the resistor 10 is equal to the lowest acceptable value thereof, the bridge is balanced and when the resistance of the resistor is less than this value, the junction point 54 is higher in potential than the junction point 56.

The bridge 48 is formed by the fixed resistor 51, the thin-film resistor 10, a fixed resistor 57 and a variable resistor 58. The resistors of the bridge 48 are selected such that: when the resistance of the resistor 10 is equal to the highest acceptable value thereof the bridge is balanced; when the resistance of the resistor 10 is lower than this value the junction point 59 of the bridge 48 is higher in potential than the junction point 61; and when the resistance of the resistor 10 is higher than this value the junction point 59 is lower in potential than the junction point 56.

An A.C. source 61 is connected across common junction points 62 and 63 of the bridges 47 and 48 to supply testing current thereto during one half of a cycle and to supply anodizing current to the cell 13 during the other half of a cycle. The cathode 17 is connected to one side of the A.C. supply 61 through a diode 64, a current limiting resistor 66 and a normally open contact 67.

The output of the bridge 47 is derived from the junction points 54 and 56 and is fed to a first detector 68 which includes an amplifier 69 and a relay 71 which controls the contact 67 and a normally closed contact 72.

The output of the bridge 48 is derived from the junction points 59 and 56 and is fed to a second detector 73 which includes an amplifier 74 and a relay 76 having a normally closed contact 77 and a normally open contact 78. Like the previous embodiments, respective capacitors 79 and 81 are connected in parallel with the relays 71 and 76.

An indicating circuit is provided which includes three lamps 82, 83 and 84. As will be explained in greater detail below, the lamps 82, 83 and 84 are interconnected with the contacts 72, 77 and 78 and the A.C. source 61, such that the "Low" lamp 82 is lit if the resistor 10 is less than the lowest acceptable value thereof; the "Acceptable" lamp 83 is lit when the resistor reaches the lowest acceptable value thereof or has an initial value greater than the lowest acceptable value, but less than the highest acceptable value thereof; and the "High" lamp 84 is lit if the resistor has a resistance value greater than the highest acceptable value thereof.

The coil 86 of a mercury wetted relay 87 is connected to the A.C. source 61 such that the relay is de-energized during the anodization half cycles and energized during the testing half cycles. When de-energized, the armature 88 of the relay, which is connected to the junction point 56, is in engagement with a set of contacts 89—89. The contacts 89—89, in turn, are connected respectively to the junction points 54 and 59. Accordingly, when the relay 87 is de-energized shorts are placed across the output of both bridges 47 and 48. During the testing half cycles the output of the source 61 reverses in polarity, thereby causing the relay 87 to energize. Energization of the relay 87 disengages the armature 88 from the contacts 89—89 whereby the shorts are removed from the outputs of the bridges 47 and 48 to enable sensing of these outputs by the detectors 68 and 73, respectively.

In operation, it will first be assumed that the resistor 10 to be anodized has an initial value less than the lowest acceptable value thereof. During the first testing half cycle (i.e., when junction point 62 is higher in potential than junction point 63 and the diode 64 prevents anodization current from flowing through the cell 13), the relay 87 energizes to remove the shorts from the outputs of the bridges 47 and 48. This enables the output signals of the bridges 47 and 48, after amplification, to be applied to the relays 71 and 76, respectively.

Since the resistor 10 is less than the preset balance value of the bridge 47, junction point 54 thereof will be at a higher potential than junction point 56. The connections from the amplifier 69 to the relay 71 are such that a bridge output signal of this polarity causes the relay 71 to energize. Energization of the relay 71 closes the contact 67 which, in turn, completes a path from the A.C. source 61 to the cathode 17 and thereby conditions the circuit for the anodization half cycle. Closure of the contact 67 also completes a circuit from the A.C. source 61 to the "Low" lamp 82, thereby lighting the lamp to indicate that the resistor 10 is below the lowest acceptable value thereof.

Since the resistor 10 is also less than the preset balance value of the bridge 48, the junction 59 will, like the junction point 54, be higher in potential than the junction point 56. However, the connections from the output of the amplifier 74 to the relay 76 are such that this signal, after amplification, is of the incorrect polarity to energize the relay 76 whereby this relay remains de-energized. It should be noted that the output signal of the bridge 48 will always be of the incorrect polarity to energize the relay 76 as long as the resistance of the resistor 10 is less than the highest acceptable value thereof.

During the next half cycle, the capacitor 79 maintains the voltage across the relay 71 at a value sufficient to maintain energization of the relay. Further, during this cycle, the junction point 63 is higher in potential than junction point 62, whereby the diode 64 is forward biased and permits anodization current to be passed through the cell 13. Concurrently, by virtue of the relay 87 being de-energized during this period, the contacts 89—89 short the outputs of the bridges 47 and 48 to prevent any signal from being transmitted to the relays 71 and 76.

The above operation is repeated during succeeding cycles of the source 61 until the resistor 10 achieves a value equal to the lowest acceptable value thereof, i.e., the preset balance value of the bridge 47. Accordingly, during the next test half cycle, the bridge 47 is balanced, whereupon no signal is applied to the relay 71 and the relay de-energizes, opening the contact 67 and closing the contact 72. Opening of the contact 67 opens the circuit from the source 61 to the cathode 17 and to the "Low" lamp 82, thereby precluding further anodization and extinguishing the "Low" lamp. Closure of the contact 72, on the other hand, completes a circuit from the source 61 through the normally closed contact 77 and the contact 72 to the "Acceptable" lamp 83 thereby lighting this lamp and apprising the operator that the anodization is complete.

Turning now to the situation where the resistance of the resistor 10 is greater than its lowest acceptable value, but lower than its highest acceptable value, it is readily seen that during a testing cycle the junction point 54 will be lower in potential than the junction point 56 and the junction point 59 will be higher in potential than the junction point 56. Accordingly, the signals applied to the relays 71 and 76 from their respective bridge outputs will be of the incorrect polarities to energize the relays. As a result, the contact 67 will not close and no anodization will take place. Further, it is seen that since both relays 71 and 76 are de-energized, an energizing circuit is completed to the "Acceptable" lamp 83, whereby this lamp lights to advise the operator that the value of the resistor 10 is within acceptable limits. It should also be noted that since the "Low" lamp 82 did not light during this operation, the operator knows that the resistor 10 did not undergo anodization, but was initially at an acceptable value. This information is, of course, very helpful in evaluating manufacturing procedures and processes.

If the resistor 10 is initially at a resistance value greater than the highest acceptable value thereof, it should be readily apparent that during a testing cycle the signal applied to the relay 76 will be of a proper polarity to cause energization thereof. Energization of the relay 76 closes the contact 78 to light the "High" lamp 84. Accordingly, the operator is advised that the resistor 10 is unacceptable and should be rejected. As in the previous case of an initially acceptable resistor, the relay 71 does not energize, whereby no anodization takes place.

Figure 5:
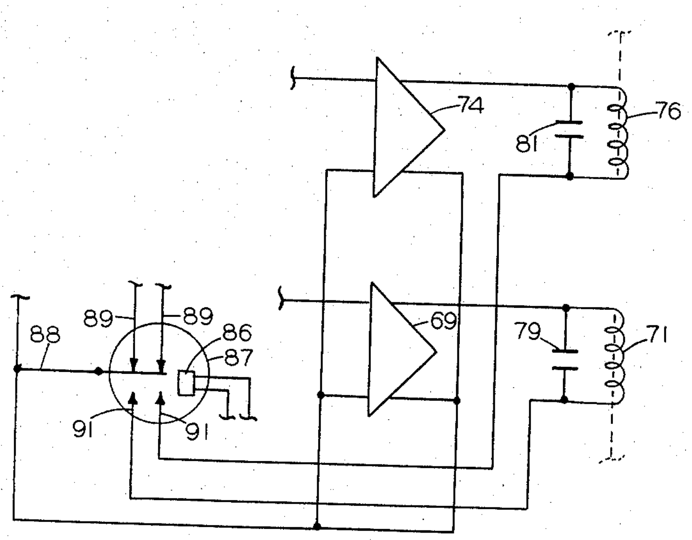
FIG. 5 is a modification of the circuit of FIG. 4 with portions removed for the sake of clarity.

Although the amplifiers 69 and 71 employed in the circuit of FIG. 4 (or FIGS. 1 and 3) can either be of the D.C. or A.C. type, it should be noted that if A.C. amplifiers are employed, the output signals of the bridges when transmitted through the amplifiers lose their zero reference. Accordingly, the zero voltage portions of the signals, i.e., the voltages which are applied to the amplifiers when the outputs of the bridges 47 and 48 are shorted, will have finite values which can cause erroneous actuation or deactuation of the relays 71 and 76. This problem is easily rectified, as shown in FIG. 5, by connecting the common ends of the relays 71 and 76 to the previously unused contacts 91—91 of the relay 87, rather than directly to the common junction point 56. Accordingly, during an anodizing half cycle when the armature 88 engages the contacts 89—89 to short the outputs of the bridges 47 and 48, the contacts 91—91 and, hence, the ends of the relays 71 and 76 connected thereto, will be open, whereby no signal can be applied to the relays to erroneously energize or de-energize them. However, during the testing half cycle when the armature 88 disengages the contacts 89—89 and engages the contacts 91—91, the common ends of the relays 71 and 76 are connected to the common junction point 56 via the contacts 91—91 and the armature 88, whereby the relays are conditioned to receive signals from their respective amplifiers.

The foregoing discussions refer to the anodization terminating when the resistor 10 achieves the preset value of a bridge in which it is connected. However, as should be apparent, the situation in which the resistor 10 will exactly achieve its nominal desired resistance value during an anodization half cycle, will occur very rarely; in most cases the resistor will either achieve a value slightly less than the nominal desired value or a value slightly greater than this value. Either of these latter situations, of course, will cause the detector relays to de-energize. However, where it may be desirable that the resistors always have a value greater than their nominal desired value, as in the circuit of FIG. 4 for example, the detector relays can be of the polarized type which de-energize only when a reverse current is passed through their coils. Since this will occur only after a bridge goes through a null or balance condition the resistors will always have a value slightly greater than the preset value of the bridge.

It should be noted that one of the advantages of using an A.C. signal to anodize is that the current and voltage in the circuits at the end of each anodizing half cycle and the beginning of each test half cycle is zero, whereby substantially no switching transients occur to impair the accurate operation of the circuits.

It is to be understood that the above-described embodiments are merely illustrative of the principles of the invention. Other embodiments may be devised by persons skilled in the art which embody these principles and fall within the spirit and scope thereof.

What is claimed is:

1. A circuit for anodizing a metal object in an electrolytic anodizing cell to increase the resistance of the object to a desired value, which comprises:

an A.C. source;

means for connecting the A.C. source to the cell such that during one-half of a cycle, the source supplies anodizing current to the cell to anodize the object and thereby progressively increase its resistance and, during the other half of a cycle, the source supplies testing current to the object to test the resistance thereof;

a detector, responsive to the voltage drop across the object resulting from the passage therethrough of the test current, for detecting when the object has reached its desired resistance value; and means for connecting the detector to the object such that the detector is operable only during the half cycle when test current is flowing through the object.

2. A circuit in accordance with claim 1, wherein the detector connecting means includes a relay synchronized with the A.C. source such that the relay connects the detector to the object during the half cycles when the source supplies testing current thereto and disconnects the detector from the object during the half cycles when the source supplies anodizing current to the cell.

3. A circuit in accordance with claim 1, wherein the A.C. source connecting means includes a unidirectional conducting device connected intermediate the cathode of the cell and the source so as to permit current flow through the cell only in one direction.

4. A circuit for anodizing a metal object in an electrolytic anodizing cell to increase the resistance of the object to a desired value, which comprises:

a Wheatstone bridge, one arm of which includes the object;

an A.C. source connected across the bridge;

a unidirectional conducting device connected intermediate the A.C. source and the cathode of the cell such that during one half cycle of the source, the source supplies testing current to the bridge to test the resistance of the object and, during the other half cycle, the source supplies anodizing current to the cell to anodize the object and thereby progressively increase its resistance;

a detector responsive to the bridge output voltage when test current is flowing therethrough for detecting when the object has reached its desired resistance value; and means for connecting the detector to the bridge output such that the detector is operable only during the half cycle when testing current is supplied to the bridge.

5. A circuit in accordance with claim 4, wherein:

the output of the bridge is of one polarity during an anodizing half cycle and of the opposite polarity during a testing half cycle; and the detector connecting means includes a unidirectional conducting device connected across the bridge output such that when the output of the bridge is of the one polarity the device conducts to short the bridge output and when the output of the bridge is of the opposite polarity the device does not conduct thereby enabling detecting of the bridge output by the detector.

6. A circuit in accordance with claim 4, wherein the detector connecting means includes a relay synchronized with the A.C. source such that the relay connects the detector to the bridge output during the testing half cycles and disconnects the detector from the bridge output during the anodizing half cycles.

7. A circuit in accordance with claim 4, wherein the detector includes means for automatically terminating the anodization when the object has reached its desired resistance value.

8. A circuit in accordance with claim 7, wherein the terminating means includes a relay having a contact thereof in series with the cell;

the contact being closed when the relay is energized to permit anodization and being open when the relay is de-energized to preclude anodization; and the relay being energized as long as the object is below the desired resistance value and being de-energized when the object has reached the desired resistance value.

9. A circuit for testing the resistance of an object to determine whether it is within predetermined upper and lower limits, and for anodizing the object in an electrolytic anodizing cell, if the resistance of the object is below the lower limit, until the resistance of the object attains the lower limit, which circuit comprises:

first and second Wheatstone bridges, each bridge including as an arm thereof the object, the first bridge being set such that it is balanced when the resistance of the object is equal to the lower limit thereof, and the second bridge being set such that it is balanced when the resistance of the object is equal to the upper limit thereof;

an A.C. source connected across both bridges;

a unidirectional conducting device connected intermediate the source and the cathode of the cell such that during one half cycle of the source, the source supplies testing current to the bridges and, during the other half cycle, the source supplies anodizing current to the cell;

first and second detectors, responsive respectively to the output voltages of the first and second bridges when test current is flowing therethrough, for detecting the condition of the bridges;

means for simultaneously connecting both detectors to their respective bridge outputs during the testing half cycles and for simultaneously disconnecting the detectors from the bridge outputs during the anodizing half cycles;

means responsive to the first detector for permitting anodization if, and as long as, the resistance of the object is below the lower limit thereof; and means responsive to both detectors for indicating whether the resistance of the object is less than the lower limit, between the upper and lower limits, or greater than the upper limit.

10. A circuit in accordance with claim 9, wherein each detector includes a relay, the relay of the first detector being energized if, and as long as, the resistance of the object is below the lower limit and the relay of the second detector being energized only when the resistance of the object is greater than the upper limit thereof.

11. A circuit in accordance with claim 10, wherein the anodization permitting means includes a normally open contact of the first detector, connected in series with the cell.

12. A circuit in accordance with claim 11, wherein the indicating means includes first, second and third lamps responsive to the condition of the detector relays, only the first lamp lighting when the first detector relay is energized, only the second lamp lighting when both detector relays are de-energized, and only the third lamp lighting when the second detector relay is energized.

References Cited

UNITED STATES PATENTS

| | | | |
|---|---|---|---|
| 3,196,094 | 7/1965 | Davis | 204—143 |
| 3,282,821 | 11/1966 | Cistola | 204—228 |

JOHN H. MACK, *Primary Examiner*.

D. R. VALENTINE, *Assistant Examiner*.